Figure 1:
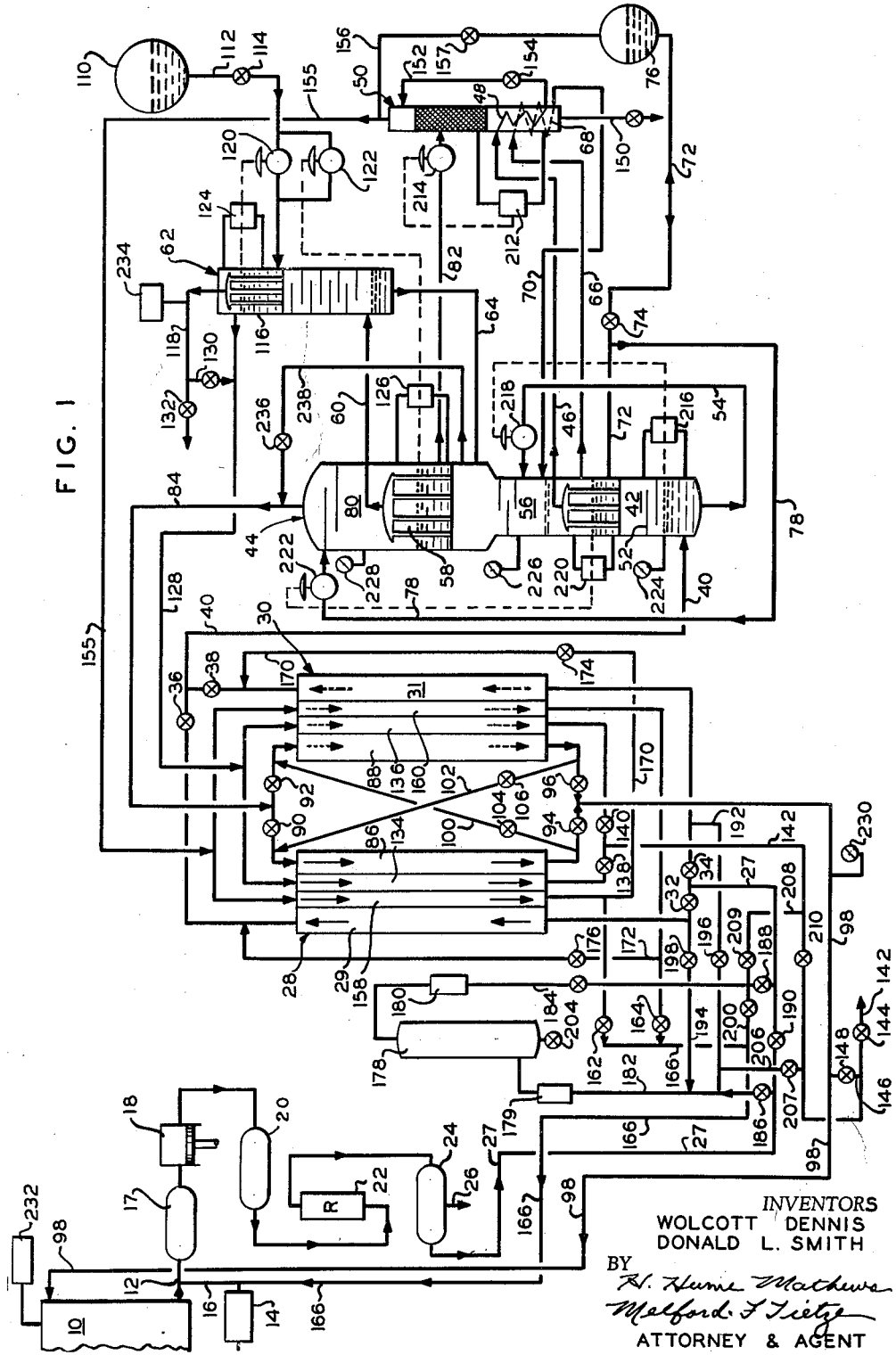

INVENTORS
WOLCOTT DENNIS
DONALD L. SMITH
BY
ATTORNEY & AGENT

Nov. 6, 1962 — W. DENNIS ETAL — 3,062,016
MAINTAINING HIGH PURITY ARGON ATMOSPHERE
Filed Dec. 31, 1957 — 2 Sheets-Sheet 2

INVENTORS
WOLCOTT DENNIS
DONALD L. SMITH
ATTORNEY & AGENT

United States Patent Office 3,062,016
Patented Nov. 6, 1962

3,062,016
MAINTAINING HIGH PURITY ARGON ATMOSPHERE
Wolcott Dennis, Basking Ridge, and Donald L. Smith, Berkeley Heights, N.J., assignors to Air Reduction Company, Incorporated, New York, N.Y., a corporation of New York
Filed Dec. 31, 1957, Ser. No. 706,466
17 Claims. (Cl. 62—22)

This invention relates to the purification of argon and, more particularly, concerns means for economically furnishing and maintaining for prolonged periods an argon atmosphere of relatively high purity for the filling of a confined chamber or enclosure.

Argon has received wide application as a protective atmosphere for use in connection with various chemical and metallurgical treatments. Frequently, the argon is provided for such purposes in the form of a shielding stream or blanket which displaces a part of the surrounding atmosphere and excludes such undesired gases from the space or the area which is sought to be protected. In line with the growing use of argon for such purposes, it recently has been found that certain types of industrial operations may advantageously be carried out in a room or chamber in which the usual atmospheric gases are completely replaced by an argon atmosphere. Under some circumstances the operating personnel may be equipped with suits much like a diver's suit and provided with a means for delivering a breathable atmosphere to enable the personnel to perform their necessary functions in the argon atmosphere of the room which, accordingly, may be of relative large dimension.

It will be seen that in such enclosures, especially those of relatively large size, numerous technological problems must be overcome in order to furnish and maintain such argon atmospheres of high purity, especially where such atmospheres are to be maintained for prolonged periods and under circumstances requiring egress and ingress of the personnel or necessary process materials to and from the chamber. The argon atmosphere in such enclosures may contain, in addition to oxygen and nitrogen impurities commonly found in crude argon from which commercial grades are derived, intolerable levels of concentration of hydrocarbon gases and other atmospheric gases such as carbon dioxide. Inasmuch as normal ventilation of such a room is not permissible, the control of humidity poses additional problems. In addition, it will be seen that the relatively high cost of argon poses still further problems with respect to the attendant waste of the argon when the normal atmosphere is initially displaced with argon gas and when the normal atmosphere is subsequently re-established such as may be done periodically for maintenance and other purposes.

The concept of argon purification as it has been applied for commercial purposes up to the present time is concerned essentially with obtaining high purity argon as a product of air rectification from a crude argon containing mainly oxygen and nitrogen as the undesired impurities. Obviously, such prevailing concepts and the processes that have been heretofore known are not applicable for purposes such as indicated above wherein the ultimate objective is entirely different and the constituent proportions of the argon gas to be purified are different and include contaminant materials not commonly found in the raw materials subjected to the usual argon purification processes.

Accordingly, it is an object of the present invention to provide a practical and economical method and apparatus for furnishing and maintaining a controlled atmosphere within an enclosure.

Another object of the invention is to provide means for furnishing and maintaining a confined argon atmosphere by an improved method of treatment and apparatus for effectively replacing the initial atmosphere with argon and maintaining it at a high level of purity, wherein the gases in the enclosure are continuously cycled through a purification system in which argon may be selectively withdrawn or introduced and in which the undesired constituents may be selectively separated.

A further object of the invention is to provide such means by the utilization of a novel combination of purification and separation steps including at least partial liquefaction and rectification of the atmosphere to be controlled.

A further object of the invention is to provide means for such a system adapted to make the most efficient use of refrigeration imparted to the cycle fluids and to make most efficient use of the raw materials employed in the purification.

A further object of the invention is to provide such a system wherein the possible inadvertent contamination of the purified argon atmosphere is reduced to a minimum.

A further object of the invention is to furnish a source of refrigeration specifically adapted for use in connection with such a purification cycle.

A still further object of the invention is to provide a novel and improved method for the purification of argon containing a multiplicity of lower boiling and higher boiling impurities to be removed therefrom.

In accordance with one embodiment of the invention the above and other objects and advantages are achieved by withdrawing a process stream of the gaseous atmosphere from a room or other confined chamber in which it is desired to furnish and maintain a high purity argon gaseous atmosphere which is successively subjected to catalytic treatment for removal of oxygen with hydrogen and rectified to provide an argon-free gaseous fraction which is separated from the process stream, and a liquid argon-containing fraction which is vaporized and returned in a continuous cycle to the chamber containing the atmosphere to be controlled. The system is arranged so that the argon-free gaseous fraction may be separated from the process stream and replaced with argon which is delivered to the chamber along with the argon product of the purification cycle. The system advantageously is further arranged to permit reverse operation whereby the argon-rich fraction instead may be separated from the process stream which is then replaced with a substitute, relatively argon-free gaseous material such as nitrogen. Thus, while undergoing continuous cyclic operation, the purification system may be operated selectively to either furnish an argon atmosphere or to recover argon therein and provide a substitute atmosphere. The catalytic separation of oxygen in the process stream is advantageously performed with an excess of hydrogen and the oxygen-free process stream preferably partially rectified subsequently to yield a hydrogen-free liquid fraction and a hydrogen-containing gaseous fraction, the hydrogen-containing gaseous fraction being employed to recycle the residual hydrogen for further removal of oxygen in the process stream and the hydrogen-free liquid fraction being further rectified to yield a substantially pure argon which is returned to the controlled chamber atmosphere. Refrigeration for the rectification is provided by means of an auxiliary refrigerant liquid preferably nitrogen, which advantageously is further employed following vaporization thereof and extraction of its available refrigeration as a replacement fluid for substitution of the argon-rich material separated from the process stream. In a further specific embodiment of the invention, the substantially hydrogen-free liquid fraction is rectified in two successive stages in the first of which a relatively argon-free gaseous fraction is withdrawn as an effluent and a nitrogen-free, argon-containing liquid fraction is drawn off as a liquid, the liquid fraction being further rectified to provide the relatively pure argon for return to the control chamber atmosphere. In such second rectification, relatively higher boiling impurities such as hydrocarbons are maintained at a desirably low level by purging of the liquid fraction therein, such purged liquid fraction preferably being further rectified in a separate rectification column employing the hydrogen-containing gaseous fraction derived from the initial separation of the process stream in which the argon content thereof is obtained as an effluent together with the residual hydrogen gas from said column and returned for recycling with the process stream. The invention advantageously employs a unique system of switching exchangers for cooling the process stream in which one of the gaseous products of the rectification other than the main process stream is employed for deriming the condenser chambers in which moisture and some carbon dioxide may be deposited while in operation. This arrangement includes means for countercurrent heat exchange of one of said fluids, preferably the hydrogen-containing gaseous fraction, with the process stream followed by the subsequent passage of the thus warmed fluid stream though the out-of-service exchanger chamber wherein such warmed stream is employed for removal of the residue previously deposited therein. In a further preferred embodiment of the invention, a separate refrigeration cycle is provided for use in connection with the rectification system of the purification cycle in which liquid nitrogen produced therein is employed for the refrigeration and which is arranged to recycle the refrigerant after its use in the purification cycle.

Figure 2:
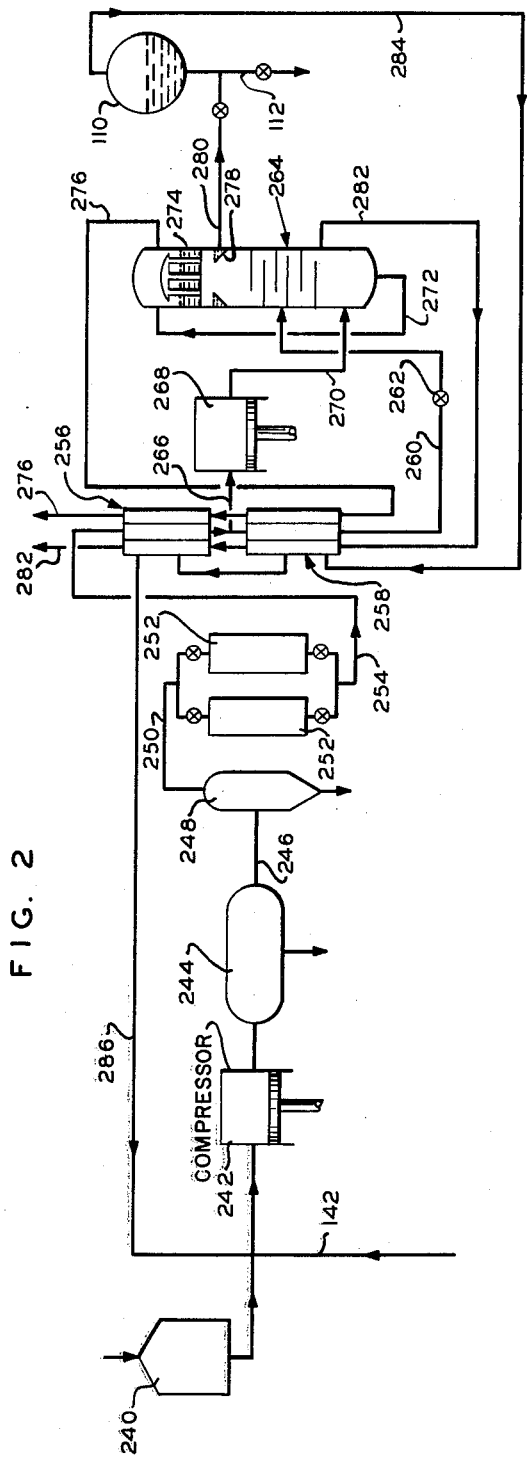

A more complete understanding of the invention, together with other objects and advantages thereof, will be had by reference to the following description of a preferred embodiment thereof and the accompanying drawings in which:

FIGURE 1 is a schematic diagram illustrating a preferred embodiment of a system adapted to furnish and maintain an argon atmosphere of high purity within a confined chamber; and FIGURE 2 is a schematic drawing illustrating an alternative arrangement, including a preferred system for furnishing refrigeration to the purification system illustrated in FIGURE 1.

In the drawing the numeral 10 designates a chamber within which it is desired to furnish and maintain an argon atmosphere of high purity. For the purpose of the present description the chamber 10 may represent a room of substantial size having a volume, for example, of the order of 64,000 cubic feet within which it may be desired to carry out operations requiring an argon atmosphere of high purity. As an illustration of the order of magnitude of the impurities which the presently described embodiment is particularly adapted to remove it may be taken as an example that the argon-rich atmosphere within the chamber 10 should not contain more than about 250 p.p.m. of impurities. The contaminants may include the various gases listed below, opposite which illustrative relative proportions thereof have been shown:

| | Percent of total impurity |
|---|---|
| Oxygen | 15 |
| Nitrogen | 60 |
| Water vapor | 10 |
| Hydrogen | ⎫ |
| Carbon monoxide | ⎬ 15 |
| Carbon dioxide | ⎪ |
| Methane | ⎭ |
| | 100 |

It should be understood, of course, that the invention as hereinafter described is not necessarily limited to these specific impurities, to such values or to a room or chamber of the specific size described.

A stream of gas to be processed is withdrawn from the chamber 10 through a conduit 12 at a rate which may be, for example, in the order of 600 standard cubic feet per minute (s.c.f.m.) which, it will be seen, corresponds to approximately about 56% of the total gas volume within the chamber. The rate of flow of the process stream may, of course, vary depending upon the presence of leaks in the enclosure or the rate at which contaminating materials may be produced therein or carried thereto, as will be well understood. In any event, it may be assumed that air is one of the sources of contamination. The process stream receives gaseous hydrogen at a controlled rate from a source 14, through conduit 16, which is admixed therewith, in mixer 17 in an amount that is in excess of the corresponding stoichiometric amount of oxygen in the process stream. For example, assuming the concentrations of 37.5 p.p.m. of oxygen in the process stream (0.023 s.c.f.m.), it is desired to maintain the hydrogen concentration in the order of 0.25 to 0.5% of the gas flow. The provision of such excess increases the flow magnitude of the hydrogen and facilitates its control. The hydrogen containing process stream is delivered to a compressor 18 and compressed to a pressure which is sufficient both for flow through the subsequent oxygen purification steps and for the liquefaction-rectification stages. Such pressure may, for example, be in the order of 55 p.s.i.a. It is highly desirable, and one of the features of this process, that the purification cycle may be operated efficiently below 100 p.s.i.a., thus avoiding difficulties of contamination attendant high pressure cycles. The compressed gas stream is then cooled in the compressor after-cooler 20 to condense and remove entrained moisture and is thence passed through a catalytic reactor 22 which promotes the flameless reaction between the hydrogen and oxygen to form water. Such catalytic removal of oxygen is well understood to those skilled in the art and need not be described herein in any detail. It is sufficient to indicate that the reactor 22 employs the usual catalyst, for example, a 5% palladium on alumina catalyst which promotes the combination of oxygen with a stoichiometric equivalent amount of the added hydrogen to form water. Such treatment is described, for example, in United States Patent No. 2,582,885. The oxygen-free process stream is passed through cooler 24 in which a considerable portion of the moisture formed by the catalytic removal of the oxygen is condensed and ejected through the condensate purge 26. Thereafter the process stream substantially free of oxygen and containing a residual amount of hydrogen, in addition to the remaining impurities, is conducted through a conduit 27 to a system of parallel connected switching exchangers designated by the numerals 28 and 30. These exchangers are so arranged that the process stream flows alternately through one or the other of the respective heat exchanger compartments 29 and 31 in which the process stream flows countercurrently to the outgoing gaseous products of the subsequent rectification as will be more fully hereinafter described. The flow directions of the gases in the exchanger are shown by the arrows in the full lines and the alternative flows are shown by the arrows in dotted lines. The selection of the exchanger in use is governed by valve 32 through which the process stream is delivered to the exchanger 28 and the valve 34 associated with the exchanger 30. Corresponding valves 36 and 38 are connected on the discharge side of the respective exchangers from which, depending upon which exchanger is in service, the thus cooled process stream is carried through conduit 40 to the lower stripper section 42 of rectification column 44. The exchangers 28 and 30 are so constructed that the process stream delivered to the stripper 42 is at about saturation so as to be at least partially liquefied in the stripper and form in the bottom or boiler section of the column a gaseous fraction containing substantially all of the residual hydrogen and a substantially hydrogen-free liquid fraction. The prevailing pressure in the stripper 42 in the operation as hereinabove described may be substantially about 52 p.s.i.a. The hydrogen-containing gaseous fraction or effluent is taken off through conduit 46 and passed through heat exchanger coils 48 to serve as a reboiling medium for the auxiliary stripper column 50 whose operation will be hereinafter described.

The stripper 42 is preferably equipped with a few plates 52 to assist in the more efficient separation of the hydrogen fraction from the process stream. Under normal operation, the effluent gas flow may be in the order of 15 s.c.f.m. It will be readily understood in a stream having the impurities at concentrations such as those above mentioned, that approximately 20% of the effluent will, therefore, constitute the hydrogen, the remainder being essentially argon with some part of the nitrogen. Such argon, however, is not lost to the system as will become more evident as the description proceeds, since this effluent is subsequently recycled with the incoming process stream. The liquid fraction from the stripper 42 is drawn from the bottom of the column and delivered through conduit 54 at an intermediate level of a middle section 56 in which this fraction undergoes a first stage of rectification which may be, for example, a pressure of about 33 p.s.i.a. Vapor passing upwardly in the section 56 produces an accumulation of nitrogen in the tubes of the top condenser 58. Such gaseous fraction contains substantially all of the nitrogen in the liquid fraction delivered to the first rectification stage 56 which together with some of the argon vaporized therein is drawn off from the top of the condenser through conduit 60 and introduced at the lower end of an auxiliary nitrogen stripper column 62 in which substantially all of the argon content thereof is removed and returned as a liquid through conduit 64 and serves to furnish a part of the liquid reflux for rectification section 56.

The liquid fraction collected at the lower end of the rectification section 56 is vaporized by the gases in the tube side of the column reboiler 42, which thus also furnishes some liquid reflux in the reboiler to assist in the initial separation effected therein. A portion of the rising vapors in column section 56 withdrawn through conduit 66 and delivered through heat exchanger coil 68 at the bottom of the auxiliary hydrocarbon stripper column 50 to assist in reboiling this column, and returned at a higher level in the plate section of the column through conduit 70. The substantially nitrogen-free liquid fraction obtained at the bottom of this section of the column is drawn off through the line 72. A valve 74 which is normally closed may be opened as will be hereinafter described to permit the rich argon liquid obtained to be delivered to a liquid storage vessel 76. In the normal operation of the column, however, the valve 74 is closed and the nitrogen-free liquid fraction from section 56 is conducted through conduit 78 and is introduced above the plates of an upper rectification section 80 which serves as the main condenser for the column 44. In the plate section of the condenser 80 the descending liquids tend to accumulate the relatively higher boiling impurities, principally hydrocarbons, which are then collected at the lower end of the section on the shell side of the condenser 58. This section of the column is at a relatively lower pressure than the section 56 and may be, for example, about 20 p.s.i.a. such that the liquid surrounding the condenser tubes is effective to condense some of the vapors rising through the rectification system 56 to furnish liquid reflux. A relatively small proportion of the total flow is drawn off as liquid from the shell side of the condenser 58 in the upper section 80 of the column which is delivered through conduit 82 to an intermediate level of the stripper column 50. The liquid thus extracted from the main column contains a high concentration of the undesired hydrocarbons and is drawn off either periodically or continuously at such a rate in proportion to the total flow through the column that the concentration of the hydrocarbons therein is reduced and maintained below some predetermined safe level. In the example herein described, this may be accomplished, for example, by continuously withdrawing from the column 80 liquid at about a rate of 3 s.c.f.m. The effluent obtained above the plates of the condenser 80 and withdrawn from this final stage of rectification constitutes a highly purified argon gas stream. Thus, as compared to the approximate concentrations of the various impurities previously indicated by way of example, the argon effluent from the top of the column 44 would preferably contain less than a total of 50 p.p.m. of the contaminants.

The effluent argon gas is taken off through a conduit 84, passed alternatively through either the chamber 86 or 88 of the exchangers 28 and 30 respectively in which the cold argon is employed to assist in cooling the incoming process stream. Valves 90 and 92 at the inlet side of the exchangers 94 and 96 at the discharge ends are arranged to be operated to selectively direct the flow of the outgoing argon through either of the exchangers from which the warmed gas is then conducted through line 98 and returned to the chamber 10. Bypass conduits 100 and 102 having corresponding control valves 104 and 106 are arranged to permit the argon, when desired, to pass successively through the respective banks of exchangers for operation thereof as will be hereinafter more fully described. Thus, for example, with valves 90, 104 and 96 open and valves 92, 94 and 106 closed the argon stream will pass first through chamber 86 and thence chamber 88. This may be done to permit the out-of-service exchanger to be preheated before drying. Refrigeration for the rectification cycle is furnished by a separate source of liquid refrigerant such, for example, as liquid nitrogen which may be held in reserve for this purpose in a suitable vessel 110 from which such liquid is delivered through conduit 112 and control valve 114 to the condenser 116 of the auxiliary nitrogen stripper column 62. Such liquid nitrogen serves to condense vapors rising in the column 62 producing returning liquid reflux and permitting a nitrogen gaseous effluent to be drawn off the top of the column through conduit 118 which is substantially pure and, accordingly, containing a minimum amount of argon which it is intended to be retained in the system. The liquid nitrogen to the condenser section may be delivered through either of control valves 120 or 122. The operation of valve 120 is controlled by the liquid level control means 124 arranged to maintain a prescribed level of liquid nitrogen in the condenser. Conjunctively the valve 122 is arranged to meter liquid nitrogen in response to the operation of the liquid level control device 126 which maintains a desired liquid level at the lower end of the upper rectification stage 80 surrounding the main column condenser 58. It will be understood that the liquid control means 124 and 126 and the corresponding responsive flow control valves 120 and 122 are conventional devices commonly employed for this purpse, well understood by those skilled in the art, and require no further description. The liquid nitrogen vaporized in the condenser section 116 is withdrawn through conduit 128. The nitrogen effluent from the top of the stripper column may be combined therewith through the valve controlled by-pass line 130 or this nitrogen which is relatively small in volume may be, if desired, vented to the atmosphere through the venting valve 132. The nitrogen carried in conduit 128 is delivered selectively to either of the switching exchangers 28 and 30 in which it passes through one or the other corresponding chambers 134 and 136. The in-service exchanger is selected by opening one or the other of the corresponding valves 138 and 140 at the discharge side from which the nitrogen refrigerant, after having given up substantially all of its available refrigeration, is discharged through an outlet conduit 142, which is provided with an outlet shutoff valve 144. It will be seen that a bypass conduit 146 is arranged upstream of the outlet valve 144 which interconnects the discharge line 142 with the return conduit 98 through which gases may be delivered to the chamber 10. Bypass valve 148, together with vent valve 144, permits the opening or closing of the bypass line and thus permits the discharge nitrogen vapors to be controllably introduced to the conduit 98 as will be more fully explained hereinafter.

The stripper column 50 advantageously is a packed column of the usual type which is arranged to receive the concentrated higher boiling impurities in the liquid fraction delivered therethrough in conduit 82 and to further concentrate such impurities to permit their effective removal by purging through the outlet 150 at the bottom of the column. Reboiling of the column is furnished by the coils 48 and 68. The hydrogen-containing fraction in coil 48 after cooling therein is delivered through conduit 152 and expansion valve 154 and introduced at the top of the column in partially liquefied condition to furnish liquid reflux for the column. The effluent taken from the top of the column contains substantially all of the residual hydrogen together with argon and a relatively minor amount of nitrogen which is withdrawn in a conduit 155. The conduit 155 is connected to the top of the argon storage container 76 by means of a vent line 156 haping a vent closing valve 157. Such vent line is employed in conjunction with the valve 74 in the liquid line to the argon reservoir for the introduction of argon from the reservoir to the system as will be further explained. The vent line permits the retention in the system of argon that is vaporized during storage in the vessel 76.

The hydrogen containing gas in conduit 155 is delivered to the switching exchangers 28 and 30 through which the gas is conducted in either of the corresponding chambers 158 and 160. The in-service exchanger is selected by opening or closing respectively the corresponding valves 162 and 164 located at the discharge end of the chambers. The warmed gas is then carried by conduit 166 and returned to the line 16 through which the recovered hydrogen is introduced and admixed with the process stream withdrawn from the chamber 10 through conduit 12. It will be seen that during the normal operation the amount of hydrogen supplied through the source 14 will merely be that amount necessary to make up the deficit consumed in the removal of the oxygen content of the gases. It will, of course, be seen that the presence of argon in the hydrogen gas does not diminish the desirability of the process since this amount of argon, remaining substantially constant, is merely continuously recycled, during normal operation, and is not lost. The presence of nitrogen, even though small, does not interfere with maintaining the desired level of purity in room 10, since this nitrogen is not returned with the cleaned process stream, but is merely recycled through the purification system.

It will be seen from the description of the circulating purification and rectification process that gas withdrawn from the chamber 10 during the normal course of operation is continuously circulated through a catalytic reactor 22 for effecting the removal of its oxygen content, thence through one or the other switching exchangers 28 and 30 wherein moisture and other freezable constituents, such as carbon dioxide, are deposited, the thus oxygen-depleted, dried and carbon dioxide-free gas then being rectified in successive stages to remove the higher boiling and lower boiling constituents to furnish a high purity argon effluent and such effluent together with the other gaseous products of the rectification and the vaporized auxiliary liquid refrigerant are returned in counter flow through the corresponding switching exchanger 28 or 30 to effect the necessary cooling of the process stream.

The warmed and purified argon is then returned to the chamber, whose atmosphere is to be controlled, the hydrogen containing gas is re-admixed with the process stream and the separated nitrogen and vaporized liquid refrigerant after having given up its available refrigeration may be vented to the atmosphere. As will be later described in connection with a further alternative embodiment of the present invention, a highly advantageous form of refrigeration cycle may be employed in connection with the purification cycle making it possible to recover the auxiliary nitrogen refrigerant.

The operation and function of the switching exchangers 28 will now be described in greater detail. It should be understood that one of the difficulties encountered in the operation of such a device in a circuit of the type herein described resides in the fact that the purified process stream upon return through the exchanger may not be employed as in a conventional reversing exchanger to derime the exchanger by passage of such gas through the chamber that is at that time placed out of service with respect to the incoming process stream. Obviously this is impossible in view of the fact that the purified gas stream would then become recontaminated with certain of the impurities that are residual in these chambers and which have been deposited therein. Accordingly, the system of switching exchangers herein employed involves an arrangement, particularly adapted for the purposes of this invention. In this arrangement, one of the other process fluids is employed for deriming by first heating in exchange with the incoming process stream and thence passing the heated fluid, relatively small in comparison to the process stream flow, through the out-of-service exchanger. Thus, for example, the hydrogen-containing gas mixture obtained from the stripper column 50 is first delivered in countercurrent flow to the incoming process stream and thence after such warming substantially to ambient temperature is conducted through the out-of-service chamber of the other condenser in which the solid residue has previously been deposited from the process stream. It will be seen that, although the relative flow of the hydrogen gas moisture is much smaller than that of the incoming process stream and would not ordinarily be sufficient for deriming purposes in a conventional reversing exchanger operating between fixed temperature limits that the increased sensible heat of the hydrogen gas will be sufficient to accomplish the reconditioning of the exchanger within the switching intervals.

The passage of the warmed hydrogen gas mixture through the out-of-service process exchanger is accomplished by means of a conduit 170 which connects the discharge side of chamber 158 with the normal exit end of process stream chamber 31 in exchanger 30, and by a conduit 172 which connects the discharge end of chamber 160 with the normal exit end of the process stream chamber 29 in exchanger 28. Each of the conduits include corresponding shutoff valves 174 and 176. With a normal process stream flow and exchanger fluid flows as indicated in the drawing, it will be seen that the desired reconditioning of the out-of-service chamber 31 is obtained by opening valve 174, valves 162 and 38 being closed, allowing the warmed hydrogen gas mixture from chamber 158 to pass through the chamber 31. The evaporated moisture carried off by the deriming hydrogen gas mixture is removed by passage of this stream through a dryer 178 having dust filter elements 179 and 180 at its inlet and outlet ends. The dryer system, it will be seen, is connected in a loop by means of a conduit 182 and a conduit 184 which are tied in to the process stream line 27 by shutoff valves 186 and 188. A line valve 190 in the conduit 27 may be closed and the valves 186 and 188 opened to permit the circulation of the process stream through the dryer loop when desired, such, for example, under startup conditions when the gas stream at this point will contain relatively great amounts of moisture. The exit hydrogen gas stream following passage through either of the out-of-service process stream and exchanger chambers is tied in with the dryer loop by means of a conduit 192 from the inlet end of chamber 131 to line 182 and by a conduit 194 connecting the normal inlet end of chamber 29 with the line 82. These connecting lines are provided respectively with corresponding shutoff valves 196 and 198. The delivery line 166 through the dried hydrogen gas stream is carried for return to the cycle is connected with the return line 84 of the dryer loop by means of a valve-controlled conduit 200. Thus, it will be seen that for drying the chamber 31 the usual line valve 162 in the hydrogen gas mixture line is closed and the valve 196 opened enabling the gas from the chamber 31 to continue through conduit 182 and the dryer loop and thence through the conduit 184 and the connecting conduit 200, the valve therein being open, so that the thus employed hydrogen gas mixture may then continue along its normal flow. For the reverse condition when the process stream is passed through chamber 31 of exchanger 30 and the hydrogen-containing gas mixture is employed to recondition the chamber 29, it will be seen that valves 162 and 164 are closed and valve 198 opened. The gas mixture will thence flow first through chamber 160 following which it will be delivered through conduit 162 to the normal outlet end of chamber 29, thence through open valve 198 and conduit 194 to the dryer loop, from which it is returned to its normal conduit 166 through the connecting line 200.

The dryer 178 may, for the purpose of the system herein described, be a dryer of the usual type. For this cycle, such dryer may advantageously have a capacity of 100 scfm. It may be effectively reconditioned by passing therethrough a purge gas by venting through a valved discharge outlet 204. Purging is accomplished by employing the nitrogen gas stream following its discharge from one or the other of the exchangers 28 and 30 when it is susbtantially at ambient temperatures. Thus, a conduit 206 having a valve 207 is furnished to connect the normal discharge line 142 with the dryer loop conduit 182 and a conduit 208 having a valve 209 similarly interconnects the nitrogen conduit 142 with the conduit 184 of the dryer loop. A line valve 210 is placed in the nitrogen conduit intermediate the bypass conduits 208 and 206 which may be closed and, with the valves 209 and 207 open, permits the nitrogen to be circulated in a reverse direction through the dryer loop and back to conduit 142. With the valve outlet 204 open the accumulated moisture within the dryer 178 may be vented together with some of the purging nitrogen gas. From the operation of the switching exchangers above described, it will be seen that the carbon dioxide deposited in the exchangers from the cooled process stream is subsequently evaporated and carried off in the fluid employed for reconditioning the out-of-service chamber. For practical purposes in this system, since the level of carbon dioxide concentratiton is sufficiently low, it may be retained in the system and merely continuously recycled therein for some time. It will be seen that such carbon dioxide essentially is isolated between the switching exchangers and the process stream delivered to the compressors and that it is not carried either into the subsequent rectification stages or admitted to the room or chamber 10 whose high purity argon atmosphere is to be controlled. The accumulated carbon dioxide can be purged during an occasional drying period by permitting a small portion of the hydrogen gas, in which the deposited carbon dioxide is carried off from the out-of-service exchanger, to be purged to the atmosphere.

It will be seen that, in the normal operation of the purification and rectification cycle as hereinabove described, that the operation of the rectification column 44 and the auxiliary columns 50 and 62 are governed by conventional liquid level control devices such as the liquid level control 124 for the column 62 as previously mentioned. Similarly, the hydrocarbon stripper column 50 has a liquid level control 212, which is operatively connected with a corresponding flow control valve 214 disposed in the liquid line 82. In the main column the reboiler section number 42 is provided with a liquid level control 216 which is operatively associated with a flow control valve 218 disposed in the liquid line 54 for metering the delivery of the argon-containing liquid fraction to the middle section 56 of the column. The liquid level in the intermediate section 56 is regulated by a liquid level control 220 which is operatively connected to a flow control valve 222 in the line 78 metering the flow of liquid to the top section 80. The liquid level control 126 of this column is operatively connected with the flow valve 122 in the liquid refrigerant line as previously described. Such devices maintain proper balance of the columns and flow through the rectification system as will be readily understood to those skilled in the art. In addition, corresponding pressure gages 224, 226 and 228 are provided to indicate the pressures respectively in the reboiler section 42, the intermediate section 54 and the top section 80 of the main rectification column. These gages furnish additional indication of the proper operation of the column and may be resorted to for manual operation of the various operating control means if necessary or desirable. In addition, a pressure gage 230 is furnished in the return line 98 whose pressure corresponds substantially to the desired pressure within the chamber 10. As will be evident hereinafter this gage serves to indicate that the total flow withdrawn from the chamber is in suitable mass balance with the flow returned therethrough by warrant of the fact that the pressure will be retained substantially constant. If desired, of course, it is possible to insert suitable flow gages in the conduits 12 and 98 respectively whose readings may be held substantially at equivalent flows to maintain mass balance, although the use of the pressure gage 230 is satisfactory for this purpose. An analyzer 232 is provided for permitting determination of composition of the atmosphere within the chamber 10. Similarly a suitable analyzer is desirably furnished in the nitrogen effluent line 118 of column 62 which is designated therein by the numeral 234. The analyzer 234 may be of any well-known type suitable for determining the purity of the effluent gas coming from the column such, for example, as a standard thermal conductivity analyzer. During the normal operation, of course, the effluent coming off of the column 62 will be substantially pure nitrogen, since the argon content therein will be condensed and returned to the main column. The vaporized nitrogen refrigerant coming from the column through conduit 128 is conducted through the bank of heat exchangers as hereinbefore described and discharged through the conduits 142, the valve 144 being open and the valve 148 being closed during such normal phase of operation. Inasmuch as the level of impurities which are actually separated from the gas withdrawn in the conduit 12 may be extremely small, as will be seen by a comparison of the illustrative figures given above, the mass return to the chamber through the conduit 98 may be substantially the same as the mass of material withdrawn. It will be seen, however, that, to the extent necessary, any mass of material separated from the system may be replaced by argon delivered from the argon storage vessel 76 by control of the valve 74. Suitable control of the necessary amount of makeup argon is afforded by delivering that amount necessary to maintain the mass balance flow as evidenced by the pressure returning on the gage 230.

At the outset of operation when the chamber atmosphere is essentially that of air, it will be seen that the operation of the column will be somewhat different. Under these conditions, the process stream is cycled as before with the necessary refrigeration of the system being furnished by liquid nitrogen from the vessel 110 to the condenser of column 62. The gas coming off the top of this column which will contain essentially no argon is merely vented to the atmosphere in the usual way. The operator may replace this discharged material with an equivalent mass of argon which is introduced as mentioned above through the valve 74 to the bottom of the intermediate section 56 of the main column. When such argon is introduced into this system, it will then, of course, be desirable to prevent the elimination of effluent from the column 62 at a rate which will permit the escape of argon therewith. This is determined by means of the thermal conductivity analyzer 234, the operator opening or closing the venting valve 144 in accordance with this reading to retain the argon. It will be seen that as the column accumulates the necessary liquid, the introduction of the argon and the venting of the nitrogen effluent may be increased without any loss of the argon. As recycling continues, the nitrogen will gradually be substantially completely eliminated from the system and will be replaced with argon. During this phase of the operation, the delivery of the argon is also preferably at such a rate that the mass balance of material taken from and returned to the chamber 10 are substantially in equilibrium. It will be also evident that the oxygen concentration within the initial gases will be considerably higher than during normal operation and that a greater amount of hydrogen will be required for its removal and accordingly a considerably greater amount of resultant water product will be formed. Accordingly, at the outset, it is desired to remove such moisture prior to the passage of the process stream through the switching exchangers which is accomplished as above described by closing the valve 190 in the process stream line 27 and opening valves 186 and 188 whereby the moisture-laden process stream is first caused to pass through the dryer 178 before passage through one of the switching exchangers. The amount of hydrogen admitted during startup is limited by explosive limits and permissible catalyst temperature to about 3% of the process stream until the oxygen has been reduced to about 1½%. The cycle, of course, requires a source of argon sufficient to fill the enclosure 10 which is fed into the system as above described. Such source may be in the form of liquid argon which may be placed in the vessel 76, or it may be gaseous argon, the latter being introduced in any suitable manner.

Correspondingly, the operation of the cycle will be somewhat different when it is desired to shut down operation and remove the argon atmosphere from the chamber 10. It will be seen that during this phase, it is highly desirable to permit the recovery of the argon from the chamber 10 rather than merely to vent it or flush it with some other gas such as air. The present system is especially unique in its particular adaptability for this purpose. During this phase the argon-rich liquid from the bottom of the intermediate column section 54 is withdrawn at a permissible rate and delivered to the storage vessel 76. This mass of material which is thus separated from the recycle system is replaced by substituting therefor nitrogen normally vented through the line 142. The separation of the argon is obtained by opening valve 74 and the substitution of the equivalent amount of nitrogen is obtained by closing vent valve 144 and opening the by-pass valve 146 which thus delivers, according to the adjustment of these valves, a desired flow of the nitrogen through the return conduit 98 together with the gas coming from the top of the main column. The adjustment of the valve 148 is determined by that amount necessary to maintain the mass balance as indicated on the pressure gage 230. As nitrogen accumulates in the chamber 10, a bypass valve 236 disposed in a conduit 238 connecting the top of the intermediate rectification section 56, just below the condenser tubes with the effluent line 84, is gradually opened to maintain column pressure while the liquid argon-containing fraction is withdrawn from the reboiler shell at the bottom of the section 56. The bypass, in effect, bypasses some of the vapor in the intermediate section from the condenser and auxiliary column 62. The condenser 58 gradually ceases to function and the intermediate section 56 then separates substantially as a single rectification column. In this operation, about 90 p.s.i.a. is provided to condense nitrogen in the reboiler section 42. This procedure may be carried out until substantially all or a reasonable amount of the argon has been recovered from the system after which operation of the purification cycle may be discontinued and the argon liquid fraction thus recovered is held for subsequent use in the storage 76. It will be understood, of course, that the container 76, as well as the refrigerant container 110, are the usual insulated vessels for holding low boiling liquids with a minimum vapor loss for substantial periods. When it is again desired to start up the operation and renew the argon atmosphere in the chamber 10, the purification cycle is placed in operation and the cycle repeated as hereinabove described. It will be seen, of course, that this system affords a maximum conservation of argon as well as the hydrogen which is also recovered and recycled as described. It will be evident, of course, that various liquid refrigerants might be used to supply the refrigeration for the purification cycle such, for example, as oxygen or air in addition to the nitrogen described in connection with the system shown in the present drawings. However, the use of nitrogen is to be preferred. In this connection, nitrogen is particularly suitable in the present cycle wherein the vaporized refrigerant liquid is introduced in the purification cycle to replace the argon withdrawn therefrom during the shutdown phase. Obviously liquid oxygen or liquid air would inherently add further oxygen to the system which would require removal from the system as long as the cycle is running in order to permit the separate recovery of the argon which would, in turn, entail the use of considerably greater amounts of hydrogen for catalytic separation, as well as additional problems inherent in the separation of the greater amount of water resulting therefrom. On the other hand, the use of nitrogen as a refrigerant and its introduction following vaporization into the system avoids these disadvantages.

The necessary refrigeration may be furnished by means of the liquefaction and refrigeration cycle illustrated in the schematic diagram of FIGURE 2. The cycle which is represented therein employs a conventional type of liquefaction and is provided with an inlet air filter 240 and a compressor 242 which may take in atmospheric air for compression to relatively high value such as 2500 p.s.i.g. The compressed air is delivered therefrom to an after cooler 244 in which moisture is condensed and ejected and thence through a conduit 246 to an oil separator 248 of the customary type. The oil free compressed air stream is carried by conduit 250 and passed through one of the two parallel flow connected dryers 252 which are arranged in the usual way to permit one of the dryers to be placed in operation while the other dryer is being reconditioned. The thus treated feed stream is delivered in conduit 254 in succession through a warm exchanger 256 and a cold exchanger 258 in which the process stream upon discharge in conduit 260 and expansion valve 262 is delivered to a single-stage rectification column 264. Refrigeration for the cycle is derived by expansion of a portion of the process air stream which is taken off through conduit 266 at a point between the warm and cold exhanger and expanded in a work engine 268 and delivered as exhaust therefrom through a conduit 270 to a point adjacent the lower end of the column 264 substantially at saturation. The thus delivered process stream is separated in the column into a relatively rich oxygen liquid fraction which is accumulated at the bottom of the column, withdrawn through line 272, and passed through the shell side of the column condenser 274. The oxygen fraction, substantially completely vaporized in the exchanger, is drawn off by conduit 276, passed in counter-current flow through the exchangers 258 and 256 and discharged to atmosphere.

The column 264 is maintained approximately at 50 p.s.i.g. sufficient to cause the major proportion of nitrogen-rich vapors at the top of the column to be condensed to provide reflux for the column. A supply of liquid nitrogen is trapped in the annular nitrogen trap 278 and is withdrawn therefrom by conduit 280 which connects with the line 112, which is the same conduit designated in FIGURE 1. The line 112 carries the necessary liquid refrigerant to the purification cycle shown in FIGURE 1 which liquid may be provided directly from the column 264 or this liquid nitrogen may be delivered in part, at least, to the reservoir 110. In actual operation, it is desirable, inasmuch as the necessary refrigeration for the purification system will in all probability be less than the normal outlet of an efficient liquefaction cycle as shown in FIGURE 2 to accmulate the excess liquid nitrogen in the reservoir 110 until such time as the refrigeration cycle may be shut down for a period of time during which the accumulated reserve may be used to supply the refrigeration for the purification system. The refrigeration cycle may thus operate intermittently while the purification cycle is operated continuously. A portion of the nitrogen-rich vapors in the column 264 may be withdrawn, for example, in a conduit such as that shown at 282 and also passed in countercurrent exchange through the exchangers 258 and 256 for assisting the cooling of the incoming process air stream and discharged to the atmosphere. Preferably also the vapor phase of the liquid nitrogen container 110 is conserved by connecting the top of the vessel by means of conduit 284 with the shell sides of the exchangers 256 and 258, thus permitting the vaporized nitrogen to be additionally passed in countercurrent exchange with the incoming process stream to recover the sensible heat of these vapors. Such nitrogen is then preferably returned for recycling with the main process stream in conduit 286.

As previously described, the nitrogen refrigerant delivered to the purification system shown in FIGURE 1 is discharged from that cycle during normal operation through the venting line 142 when the valve 144 of that line is opened. It will be seen that with the provision of the refrigeration cycle shown in FIGURE 2, the line 142, corresponding to the line identically designated in FIGURE 1, may be connected to the inlet side of the compressor 242 so that this nitrogen is returned to the refrigeration cycle for recirculation. With this arrangement, it will be seen, of course, that during the normal operation of the refrigeration cycle there will be substantially little intake of atmospheric air, corresponding essentially to the nitrogen discharged through exhaust line 282. Accordingly, the amount of carbon dioxide and atmospheric contaminants in the refrigeration cycle is extremely small, thus enhancing and favoring the safe and efficient operation of the cycle. The hydrocarbon content of the refrigeration system is maintained at an extremely low level by warrant of the continuous purge of the liquid fraction of the column 264 which is passed through the condenser and subsequently vented to the atmosphere.

It will be evident from the foregoing description that the purification system and refrigeration cycle for operation and conjunction therewith afford a highly efficient and effective means for furnishing and controlling argon of extremely high purity as an atmosphere for a confined chamber or room wherein an extremely efficient utilization is made of the raw materials employed and of the energies applied for the purposes of refrigeration and separation of the impurity contaminants. It will, of course, be apparent that numerous modifications or improvements in the specific embodiments therein shown and described may be made without, however, departing from the spirit of the invention as defined in the following claims.

We claim:

1. In an argon purification process for purifying an argon gas substantially free of oxygen and containing hydrogen, nitrogen and hydrocarbons as impurities, the steps comprising partially liquefying a feed stream of the impure argon to separate a substantially hydrogen-free liquid fraction and a gaseous fraction containing substantially all of the hydrogen, rectifying the liquid fraction in a first column, obtaining therefrom a liquid fraction substantially free of nitrogen and a gaseous fraction containing substantially all of the nitrogen content of the liquid delivered to said first rectification, delivering said liquid fraction from the first rectification to a second rectification column of relatively lower pressure than said first rectification, obtaining therefrom a high purity argon substantially free of said impurities and boiling the liquid fraction to provide vapor reflux for said second rectification by heating with the gaseous fraction from said first rectification.

2. A process according to claim 1 wherein the liquid fraction of said second rectification contains substantially all of said hydrocarbon impurity and a portion of said liquid is continuously withdrawn from said column to maintain the concentration of said hydrocarbons therein substantially constant.

3. A process according to claim 2 wherein said withdrawn liquid fraction from said second rectification is delivered to an auxiliary stripper column, the bottom of said column is boiled by heating with said hydrogen-containing gaseous fraction, said thus cooled hydrogen-containing fraction is then expanded to reduced pressure partially liquefied and delivered at the top of said auxiliary stripper column to furnish liquid reflux therefor, the hydrogen is obtained in the effluent gas therefrom and hydrocarbons are removed as purge liquid from the bottom thereof.

4. A process according to claim 3 wherein said gaseous fraction from said first rectification is admitted to second auxiliary stripper, said gases being partially condensed at the top thereof by liquid reflux supplied from a separate store of liquid and the liquid portion at the bottom of said stripper is returned as liquid reflux for said first rectification.

5. The method of furnishing a high purity argon atmosphere in a confined chamber containing argon having relatively minor amounts of contaminating gases including oxygen, nitrogen and hydrocarbons comprising continuously withdrawing a stream of said argon atmosphere from said chamber, admixing a stoichiometric excess of hydrogen therewith and catalytically combining said hydrogen with the oxygen content with said gas stream to form water, cooling said oxygen free gas stream sufficiently to deposit out water and any other relatively high boiling impurities as solid residue, partially liquefying said dry oxygen-free gas stream to form a gaseous fraction containing substantially all of said excess hydrogen and a substantially hydrogen-free liquid fraction, rectifying said hydrogen-free liquid fraction into two successive stages in the first of which substantially all of the nitrogen is separated therefrom as vapor and in the second of which the hydrocarbons are separated as a liquid fraction, obtaining high purity argon effluent from said second rectification, returning said high purity argon to said chamber and recycling the excess hydrogen recovered in said first gaseous fraction for catalytic combination with the oxygen in said stream withdrawn from said chamber.

6. The method according to claim 5 wherein said oxygen-free gas stream is cooled substantially to saturation by heat exchange with said high purity argon effluent before said high purity argon is returned to said chamber and by heat exchange with said first hydrogen containing gaseous fraction.

7. The method according to claim 6 wherein said cooling of said oxygen-free gas stream is carried out in a switching exchanger having alternate passages wherein said stream is alternately passed through one or the other thereof, said water and any other relatively high boiling impurities being deposited as solid residue therein, and said hydrogen, after heat exchange with said oxygen-free gas stream is alternately conducted through the other of said exchanger passages to effect the removal of said residue.

8. The method according to claim 7 wherein the moisture evolved from said exchanger passage and entrained in said hydrogen containing fraction is removed therefrom prior to recycling of said hydrogen.

9. A process for controllably varying the constituents of a confined atmosphere comprising continuously circulating a process stream of gases from said atmosphere through a purification cycle, said cycle including a catalytic treatment employing a stoichiometric excess of hydrogen for removing oxygen, and liquefaction and rectification of the residual-hydrogen-containing process gas stream wherein said residual hydrogen is removed in a first stage of separation and recycled with the oxygen containing process stream, and the remaining process stream substantially free of oxygen and residual hydrogen is further rectified to provide at least two further fractions, separating one of said fractions from the process stream and controllably substituting therefor another gas, said process stream being cooled in alternately used banks of exchangers prior to liquefaction and rectification by heat exchange with the rectified process stream and with said recycled hydrogen wherein constituents condensable at the temperature of said cooled gas stream are deposited, and said recycled hydrogen is employed for evaporating said residue from the exchangers not in service.

10. A process according to claim 9 wherein one of said fractions of said hydrogen-free process stream comprises argon and said argon selectively is either substituted for said other fraction or replaced therewith.

11. In a method of producing and maintaining a desired concentration of a specified gas in the atmosphere of a confined chamber, the steps comprising withdrawing a process gas stream of the atmosphere from said chamber, at least partially liquefying and rectifying said process stream to form at least two separate fractions, said partial liquefying and rectifying being effectuated by vaporizing an auxiliary refrigerant liquid by heat exchange with said process stream to cause partial condensation of said process stream and to produce a liquid fraction containing said specified gas and a vapor fraction substantially free thereof, removing at least a portion of said vapor fraction and replacing it with a substantially equivalent amount of said specified gas, returning the specified gas and the remainder of said process stream to said confined chamber and maintaining the process stream withdrawn from said chamber and the combined remainder of said process stream and specified gas returned to said chamber substantially in mass balance.

12. A process according to claim 11 wherein said specified gas comprises argon and wherein said auxiliary refrigerant liquid comprises nitrogen.

13. A method of producing and maintaining a desired concentration of a specified gas in the atmosphere of a confined chamber comprising providing a separate source of said specified gas, circulating a process stream of the atmosphere from said chamber through a purification cycle including means effective at least partially to liquefy and rectify said process stream and form at least two separate fractions, one of which fractions is relatively enriched in said specified gas and the remainder of said stream being relatively free thereof, separating at least a portion of the remainder of said process stream which is relatively free of said specified gas and substituting a substantially equivalent amount of said specified gas therefor when it is desired to increase the concentration of said specified gas in said chamber and, when it is desired to reduce the concentration of said specified gas in said chamber, separating at least a portion of said fraction containing said specified gas and replacing it with a substantially equivalent amount of another gas.

14. A method of producing and maintaining a desired concentration of a specified gas as set forth in claim 13 wherein said specified gas is substantially pure argon.

15. A method of producing and maintaining a desired concentration of a specified gas as set forth in claim 14 wherein said argon is obtained as a liquid fraction from said process stream.

16. A method of producing and maintaining a desired concentration of a specified gas as set forth in claim 13 wherein the chamber atmosphere contains oxygen, said purification cycle includes a catalytic treatment employing a stoichiometric excess of hydrogen for removing the oxygen contained in said process stream and said excess hydrogen is separated from said resulting process stream in a preliminary rectification.

17. A process for controlling the purity of a confined atmosphere comprising continuously circulating a process stream of gas of said atmosphere from a confined chamber through a purification cycle, cooling said process stream by heat exchange with a liquid product fraction obtained by the rectification of a separate air stream so as to effectively at least partially liquefy said process stream, rectifying said process stream to form two fractions, one of which corresponds to a desired atmosphere and the other of which is a gaseous fraction substantially free of said desired atmosphere, returning said fraction constituting said desired atmosphere to said chamber, delivering said other gaseous fraction to said separate air rectification, liquefying said gaseous fraction therein and collecting said thus liquefied fraction with said liquefied product fraction of said air rectification for use in said cooling of said process stream.

References Cited in the file of this patent

UNITED STATES PATENTS

| | | |
|---|---|---|
| 2,424,201 | Van Nuys | July 15, 1947 |
| 2,545,194 | Colburn et al. | Mar. 13, 1951 |
| 2,664,718 | Rice | Jan. 5, 1954 |
| 2,708,831 | Wilkinson | May 24, 1955 |
| 2,820,751 | Saller | Jan. 21, 1958 |
| 2,874,030 | Dennis | Feb. 17, 1959 |

FOREIGN PATENTS

| | | |
|---|---|---|
| 736,736 | France | Sept. 26, 1932 |
| 1,139,724 | France | Feb. 18, 1957 |